US008035869B2

(12) United States Patent
Osakabe

(10) Patent No.: US 8,035,869 B2
(45) Date of Patent: Oct. 11, 2011

(54) IMAGE READING DEVICE

(75) Inventor: Yoshinori Osakabe, Seto (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 963 days.

(21) Appl. No.: 12/004,234

(22) Filed: Dec. 20, 2007

(65) Prior Publication Data

US 2008/0158619 A1 Jul. 3, 2008

(30) Foreign Application Priority Data

Dec. 28, 2006 (JP) ................................ 2006-355459

(51) Int. Cl.
*H04N 1/04* (2006.01)

(52) U.S. Cl. ......... 358/497; 358/494; 358/474; 358/471

(58) Field of Classification Search .................. 358/497, 358/494, 474, 471, 483, 482, 505
See application file for complete search history.

(56) References Cited

U.S. PATENT DOCUMENTS

| | | | | |
|---|---|---|---|---|
| 5,610,731 | A * | 3/1997 | Itoh | 358/496 |
| 6,594,037 | B1 * | 7/2003 | Takahashi | 358/474 |
| 7,218,427 | B2 * | 5/2007 | Hirayama | 358/497 |
| 2007/0153336 | A1 * | 7/2007 | Sheng et al. | 358/474 |

FOREIGN PATENT DOCUMENTS

| | | |
|---|---|---|
| JP | 63-004545 | 1/1988 |
| JP | 63210920 | 9/1988 |
| JP | 2-257761 | 10/1990 |
| JP | 4085527 | 3/1992 |
| JP | 8228266 | 9/1996 |
| JP | 9090527 | 4/1997 |
| JP | 10-197972 | 7/1998 |
| JP | 11289430 | 10/1999 |
| JP | 2000-022901 | 1/2000 |
| JP | 2000-216952 | 8/2000 |
| JP | 2001203841 | 7/2001 |
| JP | 2001235814 | 8/2001 |

* cited by examiner

*Primary Examiner* — Houshang Safaipour
(74) *Attorney, Agent, or Firm* — Frommer Lawrence & Haug LLP

(57) ABSTRACT

An image reading device including (1) a transparent member having an image reading area, (2) a line sensor that moves in a line sensor moving direction, which is perpendicular to a reading line direction of the line sensor, (3) a first supporting structure that supports, at opposite ends of the image reading area in the line sensor moving direction, the transparent member such that the transparent member is not deformed with respect to the reading line direction when an external force is applied to the transparent member, and (4) a second supporting structure that supports, at opposite ends of the image reading area in the reading line direction, the transparent member such that the transparent member is movable between a first posture, where the transparent member is in a flat plate shape, and a second posture, where the transparent member is bent with respect to the line sensor moving direction.

14 Claims, 16 Drawing Sheets

61
VIII
14
25
63
40
23
24
17
60
VII
21
20
RIGHT
LEFT
57
11

IMAGE READING DEVICE

The present application claims priority from Japanese Patent Application Publication No. JP-2006-355459, which was filed on Dec. 28, 2006, the disclosure of which is incorporated herein by reference in its entirety.

BACKGROUND OF THE INVENTION

1. Field of the Invention

The present application relates to an image reading device in which a line sensor reads an image of a document by moving along a transparent member, which defines an image reading area, in a direction perpendicular to a reading line of the line sensor.

2. Description of Related Art

A flatbed scanner is known as an image reading device that reads an image of a stationary document. A line sensor of the flatbed scanner reads an image of a document placed on a contact glass while reciprocating along the contact glass.

The contact glass may be bent when an external force is applied, such as a pressing force of a document against the contact glass. The bending of the contact glass may cause (1) deterioration in quality of a image read by the line sensor, (2) a collision between the contact glass and the line sensor, or (3) a breakage of the contact glass.

To address the foregoing problems, several structures have been proposed for an image reading device. JP2001-235814A discloses a structure in which a rigid reinforcing frame and a dolly plate are disposed under a contact glass, and the distance between the reinforcing member and the dolly plate are adjusted using screws to correct the bend of the contact glass.

JP2001-203841A discloses a structure in which a contact glass is previously bent with respect to the sub-scanning direction of a line sensor, and the line sensor is moved while being urged toward the contact glass. Accordingly, the bending of the contact glass with respect to the main scanning direction is lessened, and the distance between the line sensor and a document is kept uniform.

JP8-228266A discloses a structure in which a middle part positioning member is provided in a support member for the line sensor. The middle part positioning member supports a contact glass being bent, thereby reducing the deviation in the focal depth of the line sensor.

However, in the structure disclosed in JP2001-235814A, the dolly plate supports only the center of a side of the contact glass, and thus the contact glass is likely to be bent at a corner portion thereof.

In the structure disclosed in JP2001-203841A, if a rigid document is placed on the previously bent contact glass, the document may float with respect to the sub-scanning direction. Or, if a document cover, when closed, does not conform to the contact glass, ambient light may enter the inside of the image reading device.

In the structure disclosed in JP228266A, because the middle part positioning member contacts a document reading area of the contact glass, the document reading area may be soiled. The middle part positioning member supports the contact glass by making a point contact with the contact glass. Thus, the load due to an external force may be applied intensively to a contact point, causing a breakage of the contact glass.

Therefore, a need has arisen for an image reading device that can maintain the quality of an image read by a line sensor even when an external force is applied to a contact glass.

SUMMARY OF THE INVENTION

An image reading device including (1) a transparent member shaped like a flat plate and having an image reading area, (2) a line sensor that moves along the transparent member in a line sensor moving direction, which is perpendicular to a reading line direction of the line sensor, so as to read an image of a document placed on the image reading area, (3) a first supporting structure that supports, at opposite ends of the image reading area with respect to the line sensor moving direction, the transparent member rigidly with respect to the reading line direction, such that the transparent member is not deformed with respect to the reading line direction when an external force is applied to the transparent member, and (4) a second supporting structure that supports, at opposite ends of the image reading area with respect to the reading line direction, the transparent member with respect to the line sensor moving direction, such that the transparent member is movable between a first posture, where the transparent member is in the flat plate shape, and a second posture, where the transparent member is bent with respect to the line sensor moving direction.

DETAILED DESCRIPTION OF EMBODIMENTS

Figure 1:
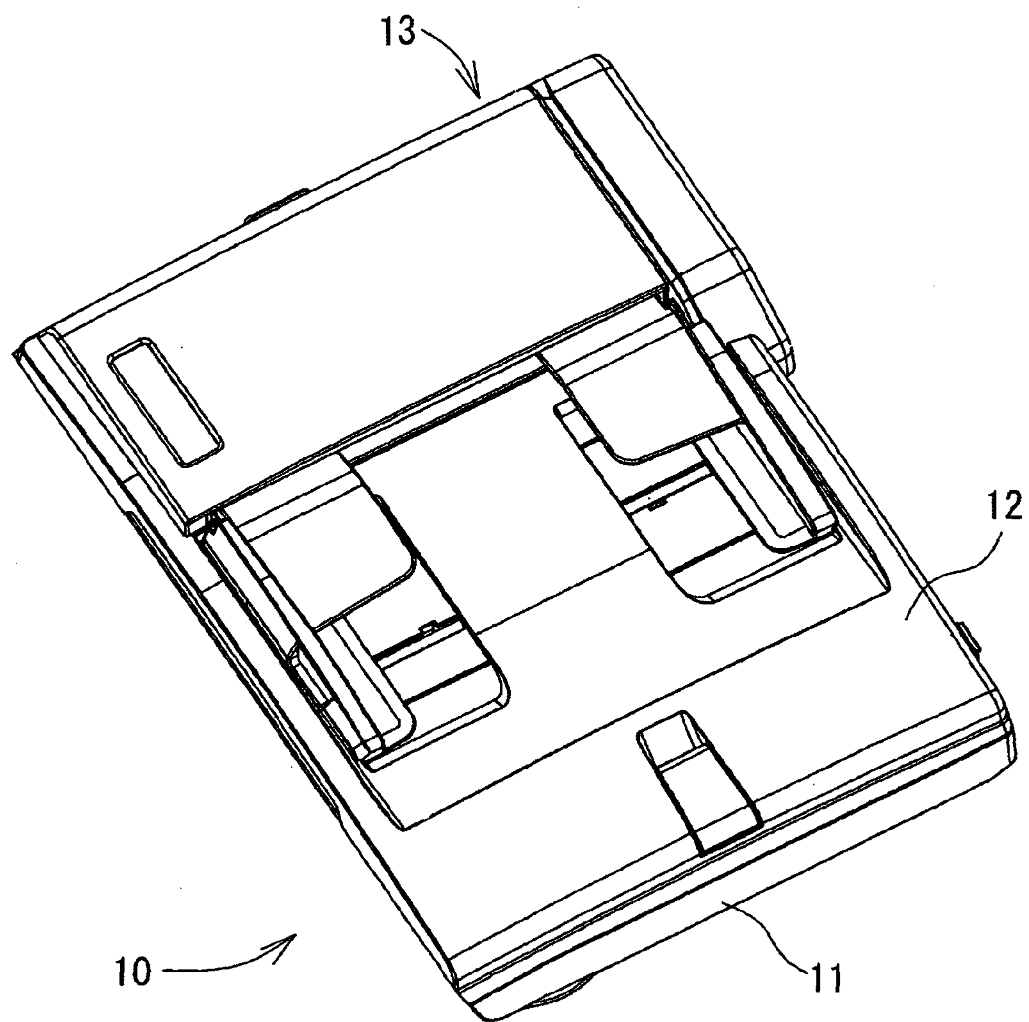
FIG. 1 is a perspective view showing an external structure of an image reading device according to a first embodiment of the present invention.

Referring now to the drawings, the present invention will be described in detail on the basis of exemplary embodiments.

Figure 2:
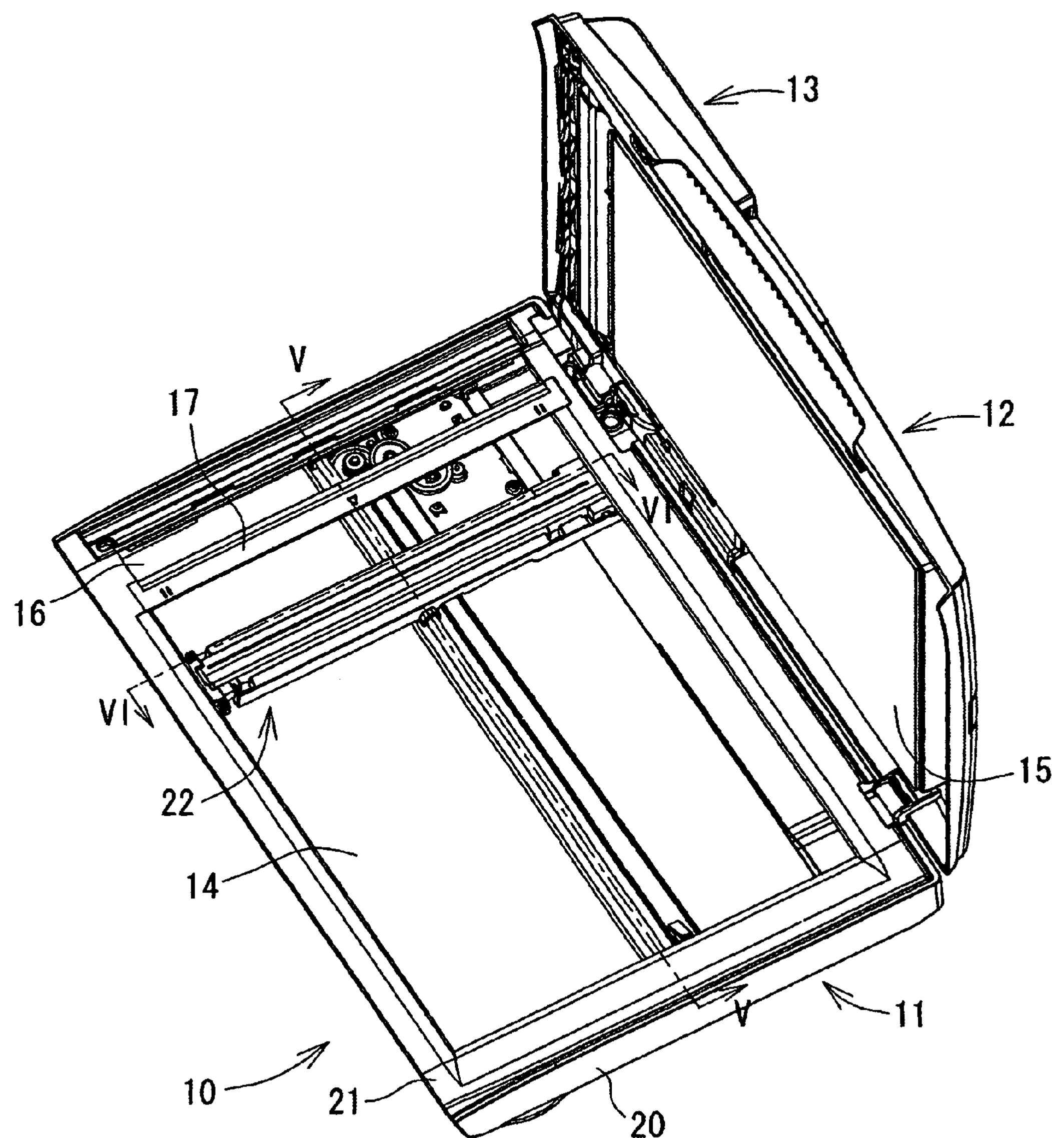
FIG. 2 is a perspective view of the image reading device with a document cover opened according to the first embodiment of the present invention.

FIGS. 1 and 2 show an external structure of an image reading device 10 according to a first embodiment of the present invention. The image reading device 10 may be a flatbed scanner (hereinafter referred to as FBS). Although the image reading device 10 of the present embodiment only has a scanning function, the invention is not so limited. For example, the image reading device 10 may also be a multi-function device, such as a copier or a facsimile.

The image reading device 10 may be used while being connected to an external information device such as a computer. The external information device includes an interface and a driver to communicate with the image reading device 10. The image reading device 10 operates according to instructions inputted from the external information device. Or, the image reading device 10 operates according to instructions inputted through operations keys (not shown) provided on the image reading device 10.

The image reading device 10 includes a document stand 11 and a document cover 12. An image of a document is read while ambient light is blocked by the document cover 12, which covers the document placed on an upper surface of the document stand 11. The document stand 11 has a relatively thin box shape. The document cover 12 has the same shape in a plan view as that of the document stand 11. The document cover 12 is openably coupled to the document stand 11. An automatic document feeder (hereinafter referred to as ADF) 13 is mounted on an upper surface of the document cover 12. Details of the ADF 13 will be omitted because the structure and function of the ADF 13 are not directly related to the present invention.

As shown in FIG. 2. the document stand 11 has, on its upper surface, a rectangular opening. A transparent member, in this case contact glass 14, is exposed through the opening. An image reading unit 22 is disposed in the document stand 11. When the document cover 12 is closed, the document cover 12 covers the contact glass 14. A presser member 15, including a sponge and a white plate, is provided under the document cover 12. When the document cover 12 is closed, the presser member 15 closely contacts the contact glass 14 so as to hold a document on the contact glass. In this state, the image reading unit 22 moves along the contact glass 14 to read the document. The contact glass 14 may be a transparent glass plate having a flat plate shape. When no external force is applied to the contact glass 14, it remains in a flat plate shape where upper and lower surfaces are flat. An area of the contact glass 14 that is exposed to an upper surface of the document stand 11 is an image reading area for the FBS.

An image reading area 16 for the ADF 13 is provided next to the image reading area for the FBS on the upper surface of the document stand 11. A document conveyed by the ADF 13 opposes the image reading area 16. The image reading area 16 is formed by a portion of the contact glass 14. A dividing member 17, attached at a predetermined position on the contact glass 14, divides the single contact glass 14 into two areas: the image reading area for the FBS and the image reading area for the ADF 13. The image reading area 16 is optional to the present invention.

Figure 3:
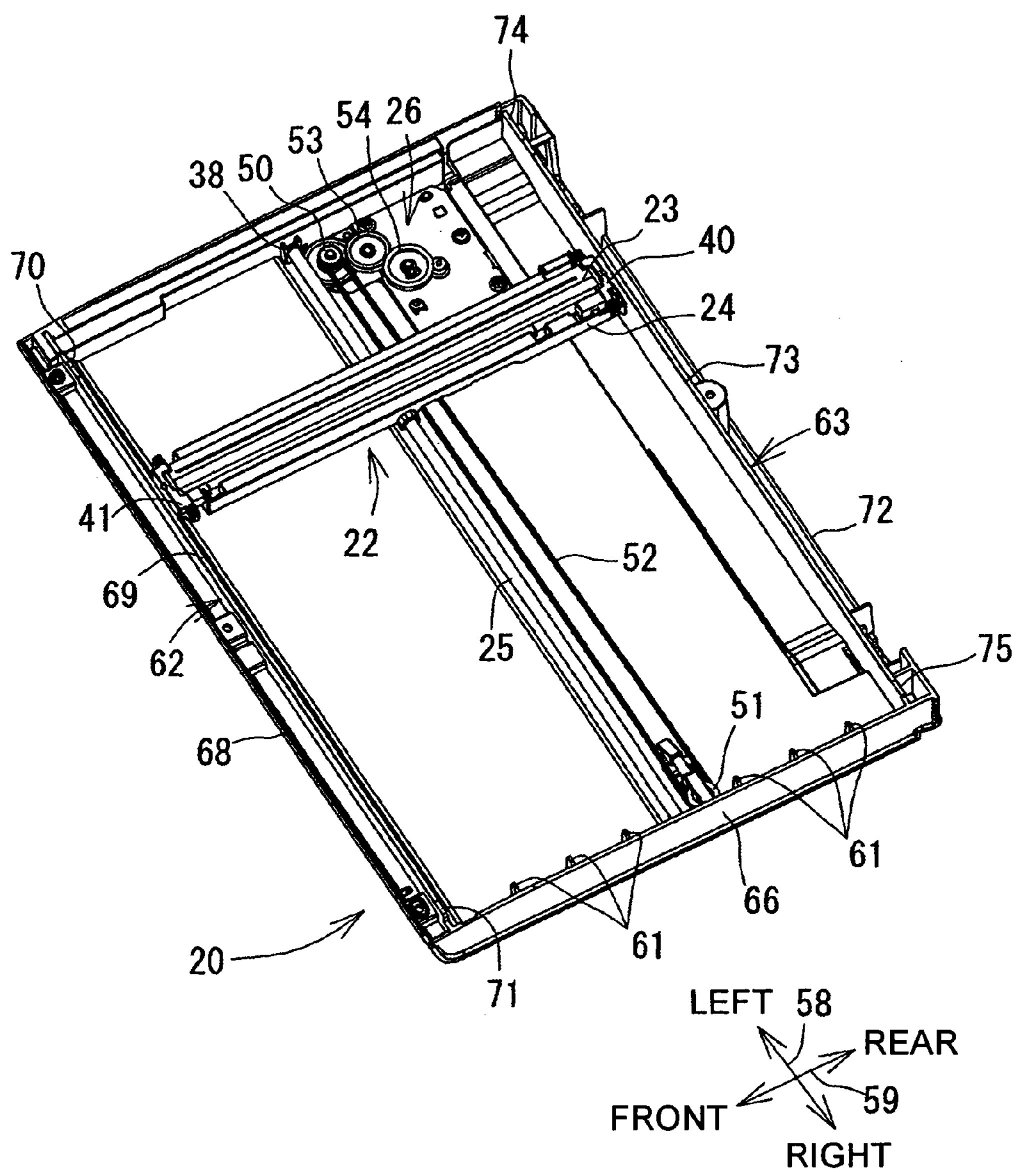
FIG. 3 is a perspective view showing an internal structure of a document stand according to the first embodiment of the present invention.

FIG. 3 is a perspective view showing an inner structure of the document stand 11. As shown in FIG. 2, a housing of the document stand 11 includes a lower frame 20 and an upper cover 21. In FIG. 3, the upper cover 21 and the contact glass 14 of the document stand 11 are removed.

The contact glass 14 is disposed on the lower frame 20, which supports a periphery of the contact glass 14. The upper cover 21 covers the periphery of the contact glass 14. Supporting portions 61-63 are provided along side walls 66, 68, 72 of the lower frame 20 to support the contact glass 14. Details of the supporting portions 61-63 will be described later. The supporting portions 61-63 are positioned outside the opening of the upper cover 21. The contact glass 14 is supported horizontally by the supporting portions 61-63 at positions of the contact glass 14 which are more peripheral than the area of the contact glass 14 which is exposed through the upper cover 21. Bosses for screwing various members and through holes for electrical wiring are provided in the lower frame 20. Details of such members and through holes will be omitted because they may be designed arbitrarily.

The image reading unit 22 is stored in the lower frame 20. The image reading unit 22 includes (1) a line sensor, in this case a contact image sensor (hereinafter referred to as CIS) 23, (2) a carriage 24, (3) a guide shaft 25, and (4) a belt driving mechanism 26.

Figure 4:
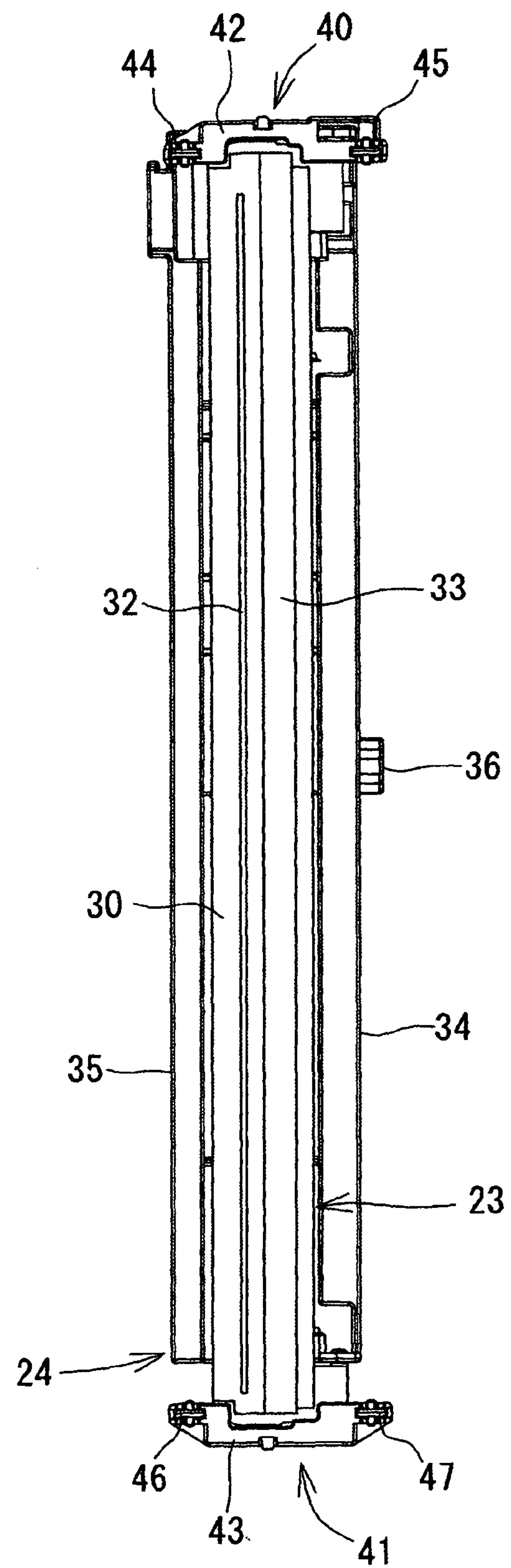
FIG. 4 is a plan view showing a contact image sensor (CIS) and a carriage according to the first embodiment of the present invention.

FIG. 4 is a plan view of the CIS 23 and the carriage 24. As shown in FIG. 4, the CIS 23 has an upper surface 30 that is flat and has an elongated rectangular shape in the plan view. A housing (not shown) of the CIS 23 has an elongated box shape having six faces, one of which is the upper surface 30. A light guide 32 is provided on the upper surface 30 to guide the light from a light emitted diode (LED) built in the housing. The light guide 32 extends in a longitudinal direction of the housing. The light from the LED is guided to be emitted through the upper surface 30 of the CIS 23 along the longitudinal direction of the housing. Converging lenses 33 are also provided in parallel with the light guide 32 on the upper surface 30. One example of the converging lenses 33 includes an array of SELFOC (registered trademark) lenses.

Although not shown in FIG. 4, light-receiving elements are provided right below the converging lenses 33 in the housing of the CIS 23. The light-receiving elements are arrayed in the same direction as the converging lenses 33. A document placed on the contact glass 14 is irradiated with the light emitted from the LED of the ICS 23, and the converging lenses 33 converge the light reflected by the document into the light-receiving elements. The light receiving elements are light-electric converting elements which output electrical signals according to the intensity of the reflected light. The CIS 23 outputs electrical signals as image signals for one reading line. The longitudinal direction of the housing of the CIS 23 corresponds to a direction along the reading line of the CIS 23. The direction along the reading line is referred to as the main scanning direction, and a direction perpendicular to the main scanning direction is referred to as the sub-scanning direction.

Figure 6:
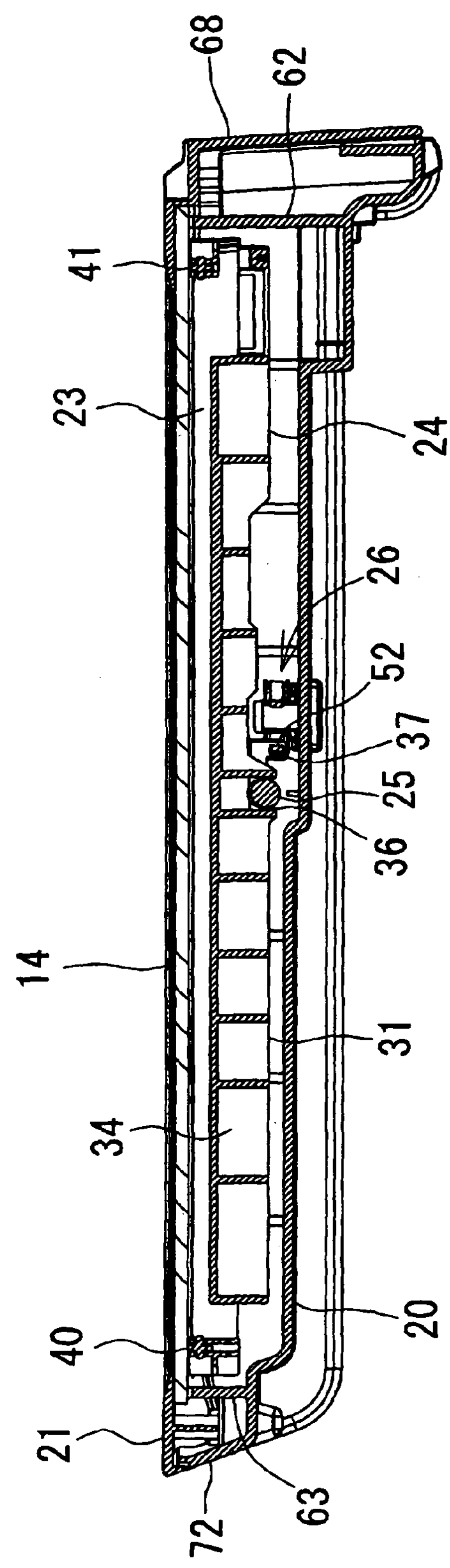
FIG. 6 is a sectional view taken along line VI-VI in FIG. 2.

The CIS 23 is mounted on the carriage 24. The carriage 24 has a container shape with its top open. The carriage 24 has walls 34, 35 standing upright from opposed ends in the sub-scanning direction of a bottom 31 (FIG. 6). The CIS 23 is stored between the walls 34, 35. The upper surface 30 of the CIS 23 mounted on the carriage 24 is exposed through the top opening of the carriage 24. As shown in FIGS. 4 and 6, a recess 36 is formed near the bottom 21 in the wall. The recess 36 is formed, along the sub-scanning direction, into an arch shape with its bottom open. The carriage 24 slides along the guide shaft 25 when the guide shaft 25 is fitted in the recess 36.

Although not shown in FIG. 4, the CIS 23 and the carriage 24 may be fitted to each other by engagement of projections and recesses to be positioned in the main scanning direction and the sub-scanning direction. The CIS 23, when mounted on the carriage 24, is vertically movable in a predetermined range. Coil springs (not shown) are disposed between the bottom of the CIS 23 and the bottom 31 of the carriage 24. The CIS 23 is urged upwardly by the coil springs.

Roller units 40, 41 are provided on both ends in the longitudinal direction of the CIS 23. The roller units 40, 41 are positioned on both ends of the upper surface 30. Each of the roller units 40, 41 includes a pair of rollers 44, 45 or 46, 47 that are arranged in the sub-scanning direction in the frame 42 or 43. Each of the rollers 44-47 is rotatable around an axis, which is parallel to the main scanning direction, and is supported by one of the frames 42 and 43. The rollers 44-47 contact a lower surface of the contact glass 14 so as to keep uniform a distance between the top surface of the CIS 23 and the lower surface of the contact glass 14. In addition, the rotations of the rollers 44-47 allow the CIS 23 to move smoothly with respect to the contact glass 14.

As shown in FIG. 3, the guide shaft 25 is provided in the lower frame 20 to extend with its longitudinal direction parallel to the sub-scanning direction. Both ends of the guide shaft 25 are engaged in engagement portions 38 (only one of them is shown in FIG. 3) that are opposed to each other in the sub-scanning direction. The guide shaft 25 is a rod which has a circular cross-section.

As shown in FIG. 3, the belt driving mechanism 26 includes a driving pulley 50, a driven pulley 51, and a timing belt 52 wound around the pulleys 50, 51. The timing belt 52 is an endless belt having teeth inside thereof. The timing belt 52 is stretched along the guide shaft 25. The driving force of a motor is transmitted to the driving pulley 50 via transmission gears 53, 54. When the driving pulley 50 rotates, the timing belt 24 circulates. The carriage 24 is coupled to the timing belt 52 at a pinching portion 37 (FIG. 6) at the bottom 31 of the carriage 24. The circular movement of the timing belt 52 is transmitted to the carriage 24, and the carriage 24 slides horizontally in the sub-scanning direction along the guide shaft 25.

Figure 5:
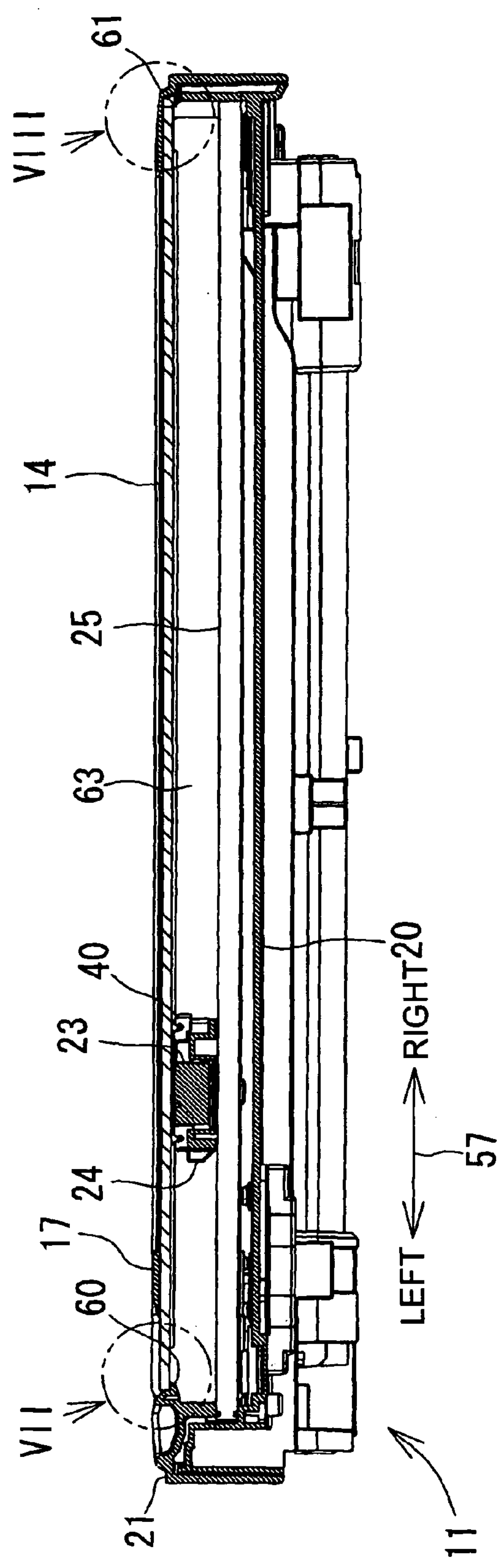
FIG. 5 is a sectional view taken along line V-V in FIG. 2.
Figure 7:
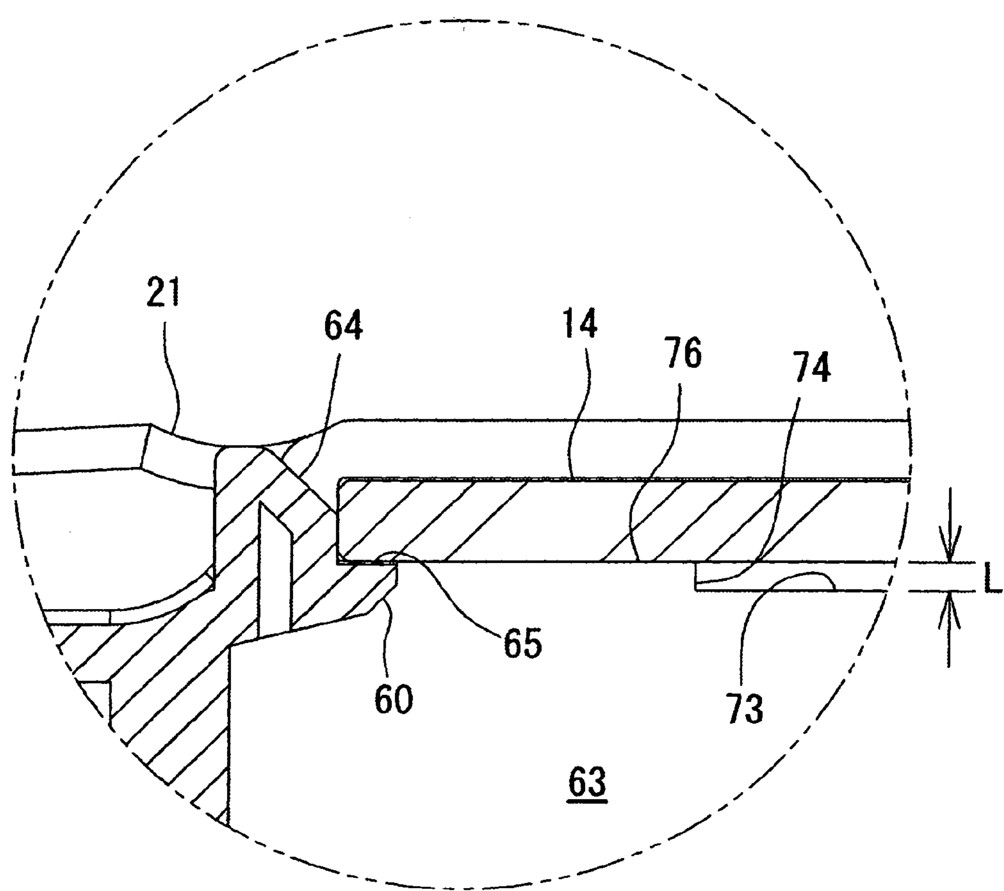
FIG. 7 is an enlarged view of portion VII in FIG. 5.
Figure 8:
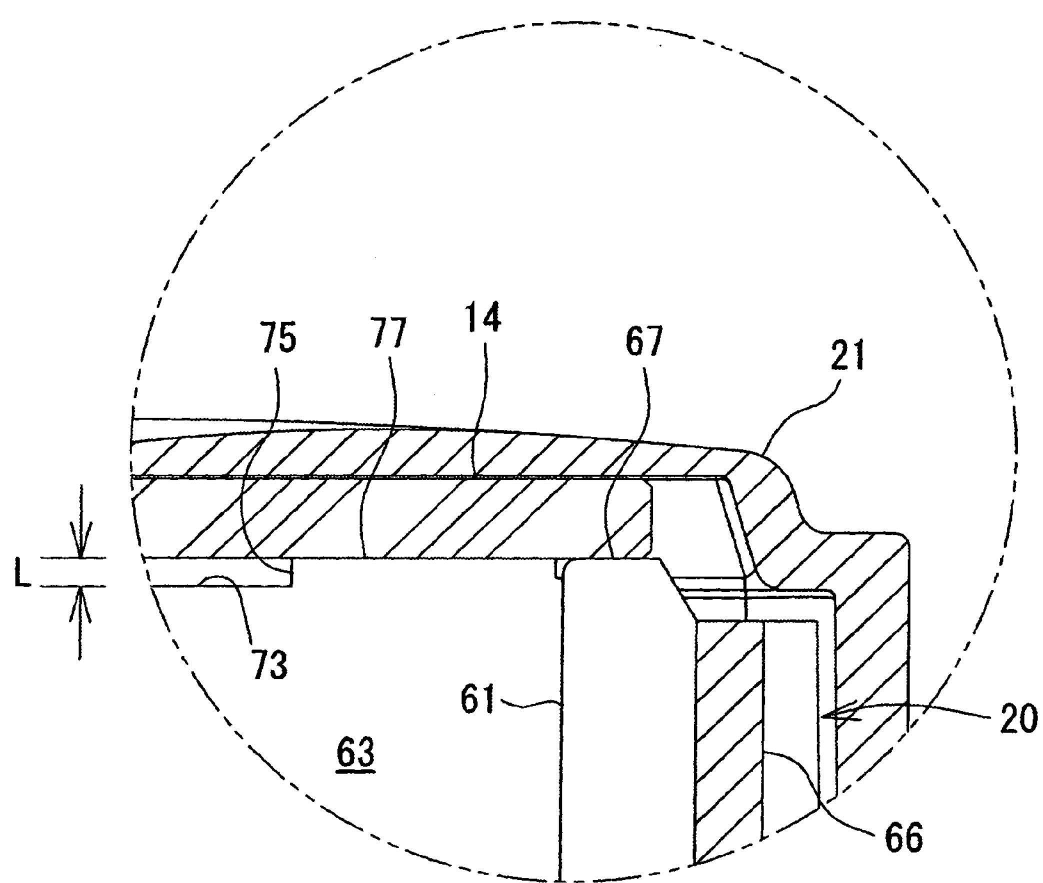
FIG. 8 is an enlarged view of portion VIII in FIG. 5.

Referring now to FIGS. 5 through 8, the supporting portions 60-63 will be described in detail. FIG. 5 is a sectional view taken along line V-V in FIG. 2. FIG. 6 is a sectional view taken along line VI-VI in FIG. 2. In FIGS. 5 and 6, the document cover is omitted. FIG. 7 is an enlarged view of portion VII in FIG. 5. FIG. 8 is an enlarged view of portion VIII in FIG. 5.

As shown in FIG. 3, the supporting portions 61-63 are provided inside the side walls 66, 68, 72. The supporting portions 61 are provided at the right end of the lower frame 20. The supporting portion 62 is provided at the front of the lower frame 20. The supporting portion 63 is provided at the rear of the lower frame 20. In FIG. 3, the direction shown by double-headed arrow 58 is a right-left direction, and the direction shown by double-head arrow 59 is a front-rear direction. The right-left direction corresponds to the moving directions of the CIS 23 (i.e., sub-scanning direction). The front-rear direction corresponds to the direction along the reading line of the CIS 23 (i.e., main scanning direction). As shown in FIGS. 5 and 7, a part of a first supporting structure, in this case the supporting portion 60, is provided at the left edge of the opening of the upper cover 21. In FIG. 5, the direction shown by double-headed arrow 57 is the right-left direction.

As shown in FIG. 7, the supporting portion 60 projects horizontally from the edge 64 of the opening of the upper cover 21. The supporting portion 60 is formed continuously along the edge 64 in the front-rear direction (direction perpendicular to the plane of the drawing sheet of FIG. 7) and has substantially the same length as the contact glass 14 in the front-rear direction. An upper surface 65 of the supporting portion 60 is horizontal. An end of the contact glass 14 is supported by the upper surface 65.

As shown in FIG. 3, another part of the first supporting structure, in this case the supporting portions 61, are ribs provided inside the right side wall 66 of the lower frame 20. The supporting portions 61 are provided at predetermined intervals corresponding to the length of the contact glass 14 in the front-rear direction. It does not matter whether the ribs are formed separately from each other or formed into a single body. The interval between ribs and the number of ribs may be changed so long as the contact glass 14 is supported rigidly by the ribs. One of the supporting portions 61 will be described by way of example because the supporting portions 61 are identical in shape.

As shown in FIG. 8, the supporting portion 61 is a rib projecting inwardly from the right side wall 66 of the lower frame 20. An upper surface 67 of the supporting portion 61 is horizontal. An end of the contact glass 14 is supported by the upper surface 67.

As shown in FIG. 3, the supporting portion 62 is a rib standing upright along and inside the front side wall 68. The supporting portion 62 extends along substantially the entire length of the lower frame 20 in the right-left direction. More parts of the first supporting structure, in this case projections 70, 71, are provided at right and left ends of the supporting portion 62 so as to project upward from an upper end 69 of the supporting portion 62. The projections 70, 71 contact the lower surface of the contact glass 14 and support the contact glass 14.

As shown in FIG. 3, the supporting portion 63 is a rib standing upright along and inside the rear side wall 72. The supporting portion 63 extends along substantially the entire length of the lower frame 20 in the right-left direction. Yet more parts of the first supporting structure, in this case projections 74, 75, are provided at right and left ends of the supporting portion 63 so as to project upwardly from an upper end 73 of the supporting portion 63. The projections 74, 75 contact the lower surface of the contact glass 14 and support the contact glass 14.

It will now be described how the supporting portions 62, 63 support the contact glass 14. The supporting portions 62, 63 are symmetrical with respect to the front-rear direction, and they only differ in that the supporting portion 62 supports the front end of the contact glass 14 while the supporting portion 63 supports the rear end of the contact glass 14. Therefore the supporting portion 63 will be described by way of example and description of the supporting portion 62 will be omitted.

As shown in FIG. 7, the projection 74 is formed at the left end of the supporting portion 63. An upper surface 76 of the projection 74 is flush with an upper surface 65 of the supporting portion 60. The contact glass 14 is supported by the upper surfaces 65, 76. The left end of the contact glass 14, which is supported by the upper surfaces 65, 76, extends along the reading line of the CIS 23 (i.e., the main scanning direction). The supporting portion 60 and the projection 74 prevent the left end of the contact glass 14 from being bent downwardly when a downward load is applied to the contact glass 14. In other words, the left end of the contact glass 14 is supported rigidly by the supporting portion 60 and the projection 70 with respect to the direction along the reading line.

As shown in FIG. 8, the projection 75 is formed at the right end of the supporting portion 63. An upper surface 77 of the projection 75 is flush with an upper surface 67 of the supporting portion 61. The contact glass 14 is supported by the upper surfaces 67, 77. The right end of the contact glass 14, which is supported by the upper surfaces 67, 77, extends along the reading line of the CIS 23. The supporting portion 61 and the projection 75 prevent the right end of the contact glass 14 from being bent downwardly when a downward load is applied to the contact glass 14. In other words, the right end of the contact glass 14 is supported rigidly by the supporting portion 61 and the projection 75 with respect to the direction along the reading line.

As shown in FIGS. 7 and 8, a part of a second supporting structure, in this case an upper end 73 of the supporting portion 63, is not in contact with the contact glass 14. The upper end 73 is recessed from the lower surface of the contact glass 14 by a predetermined distance L. The upper end 73 defines a horizontal surface in the right-left direction. Accordingly, the distance L is uniformly provided in the right-left direction between the upper end 73 and the contact glass 14. The distance L is set such that the upper end 73 contacts the lower surface of the contact glass 14 when the contact glass 14 is bent downwardly by a load applied to the contact class 14. Another part of a second supporting structure, in this case the upper end 69 of the supporting portion 62, and the projections 70, 71 are identical in shape with the upper end 73 of the supporting portion 62, and the projections 74, 75, respectively.

As describe above, both ends of the contact glass 14 which extend along the reading line are rigidly supported with respect to the direction along the reading line (direction of double-headed arrow 59 in FIG. 3) by the supporting portions 60, 61 and the projections 70, 71, 74, 75. Both ends of the contact glass 14 which extend along the CIS moving direction (direction of double-headed arrow 58 in FIG. 3) are supported such that the contact glass 14 can change between the flat plate shape (first posture) and the bent shape (second posture).

Operation of the image reading device 10 will now be described. When a document is placed on the contact glass 14 and an instruction to start reading is inputted to the device 10, the carriage 24 is driven by the belt driving mechanism 26 and moves along the guide shaft 25 in the direction of double-headed arrow 57 (FIG. 5). The CIS 23 mounted on the carriage 24 moves with the carriage 24. The roller units 40, 41 provided on the upper surface of the CIS 23 contact the lower surface of the contact glass 14. While moving along the contact glass 14, the CIS 23 emits light to the document at a predetermined timing and reads an image of the document.

If the document placed on the contact glass 14 is a book document, the user may push the back of the book toward the contact glass 14 such that the book document closely contacts the contact glass 14. At this time, a downward load (external force) is applied to the contact glass 14.

Figure 9:
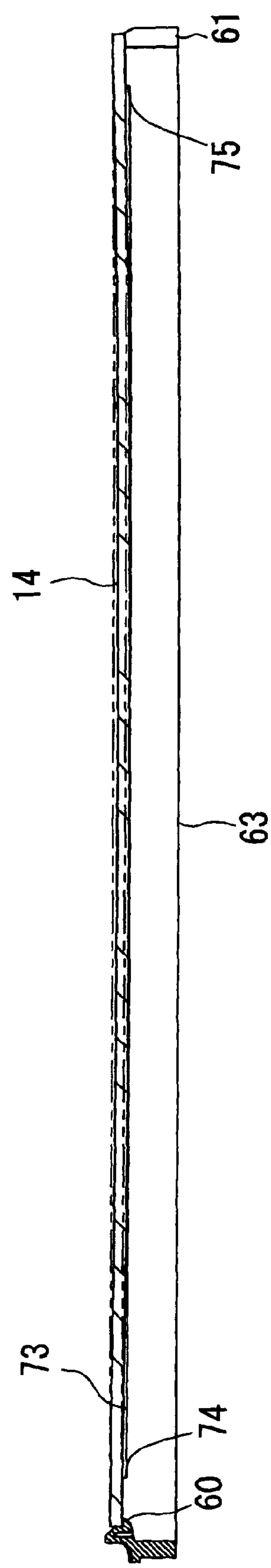
FIG. 9 is a view showing a contact glass in a second posture according to the first embodiment of the present invention.
Figure 10:
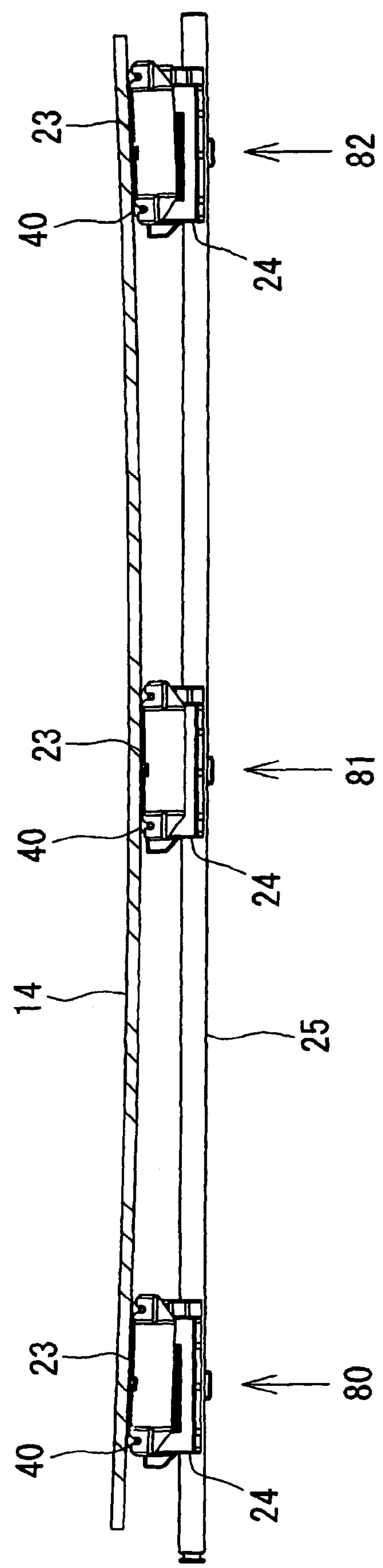
FIG. 10 is a view showing the CIS that is moving along the contact glass in the second posture according to the first embodiment of the present invention.

FIG. 9 is a sectional view showing the contact glass 14 that is in the second posture. Although FIGS. 5 and 9 are sectional views taken along the same line, components other than the contact glass 14 and the supporting portions 60, 61, 63 are omitted from FIG. 9. FIG. 10 is a view showing the CIS 23 moving along the contact glass 14 while the contact glass 14 is in the second posture. Although FIGS. 5 and 10 are sectional views taken along the same line, components other than the contact glass 14 and the CIS 23 are omitted from FIG. 10. The CIS 23 is shown at three positions 80, 81, 82 in FIG. 10. It should be noted, however, that only one CIS 23 is provided for the image reading device 10. The three CISs 23 shown in FIG. 10 are merely meant to depict three positions of a single CIS 23.

As shown in FIG. 9, when a downward load is applied to the contact glass 14, the contact glass 14 is bent downwardly until the contact glass 14 contacts both the upper end 69 of the supporting portion 62 (not shown), and the upper end 73 of the supporting portion 63 (shown). In FIG. 9, the first posture of the contact glass 14 is shown by a chain double-dashed line while the second posture of the contact glass 14 is shown by a solid line. When no external force is applied to the contact glass 14, the contact glass 14 takes the first posture and maintains the flat plate shape. When a downward load is applied to the contact glass 14, the contact glass 14 changes from the first posture to the second posture. Even in the second posture, the contact glass 14 is not deformed with respect to the reading line because both the left and right ends of the contact glass 14 are rigidly supported by the supporting portions 60, 61 and the projections 70, 71, 74, 75. Accordingly, a load applied to the contact glass 14 is manifested as a bending of the contact glass 14 with respect to the CIS moving direction, and the rigidity of the contact glass 14 with respect to the direction along the reading line of the CIS 23 is maintained. In addition, even when the contact glass 14 is bent considerably by a large load, the contact glass 44 being bent is supported by the upper ends 69, 70, and is thereby prevented from being broken.

As shown in FIG. 10, the CIS 23 is configured to move along the contact glass 14 while the contact glass 14 is in the second posture. Since the CIS 23 is urged by the coil springs upwardly toward the carriage 24, as described earlier, the CIS 23 moves vertically along the lower surface of the contact glass 14 while the CIS 23 moves in the CIS moving direction. A distance between the upper surface 30 of the CIS 23 and the lower surface of the contact glass 14 is kept uniform by the roller units 40, 41.

Specifically, as shown in FIG. 10, when the contact glass 14 is in the second posture, the contact class 14 is bent in its most downwardly position at substantially its center in the CIS moving direction. The lower surface of the contact glass 14, at position 80 in FIG. 10, is inclined downwardly toward the center. The roller units 40, 41 follow the inclination of the contact glass 14, and the CIS 23 changes its posture along the inclination of the contact glass 14. The carriage 24 supports the CIS 23 such that the CIS 23 is vertically movable. Accordingly, the CIS 23 is lowered at its one side (right side in FIG. 10) to follow the inclination of the contact glass 14.

At position 81 in FIG. 10, the CIS 23 is positioned at substantially the center of the lower surface of the contact glass 14. At position 81, the contact glass 14 is bent in its most downwardly position, and the entire CIS 23 is lowered with respect to the carriage 24 via the roller units 40, 41 so that the CIS 23 may follow the bend of the contact glass 14.

At position 82 in FIG. 10, the lower surface of the contact glass 14 is inclined downwardly toward the center. The roller units 40, 41 follow the inclination of the contact glass 14, and the CIS 23 changes its posture along the inclination of the contact glass 14. The CIS 23 is lowered at its one side (left side in FIG. 10) to follow the inclination of the contact glass 14. In this way, the CIS 23 follows the contact glass 14 in the second posture. Thus, the reading quality with respect to the CIS moving direction is maintained.

The contact glass 14 is not bent at any positions 80-82 with respect to the direction along the reading line of the CIS 23 (direction perpendicular to the plane of the drawing sheet of FIG. 10). A distance between the upper surface of the CIS 23 and the contact glass 14 is therefore kept uniform with respect to the direction along the reading line. Thus, the reading quality with respect to the direction along the reading line is maintained.

Figure 11A:
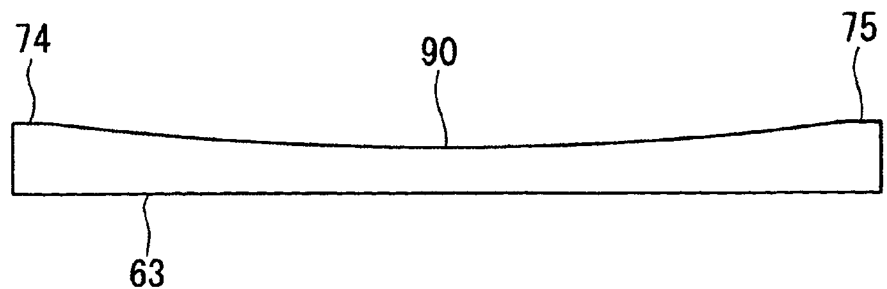
FIGS. 11A-11D are views each showing a modified upper end of a supporting portion extending along a CIS moving direction according to the first embodiment of the present invention.
Figure 11B:
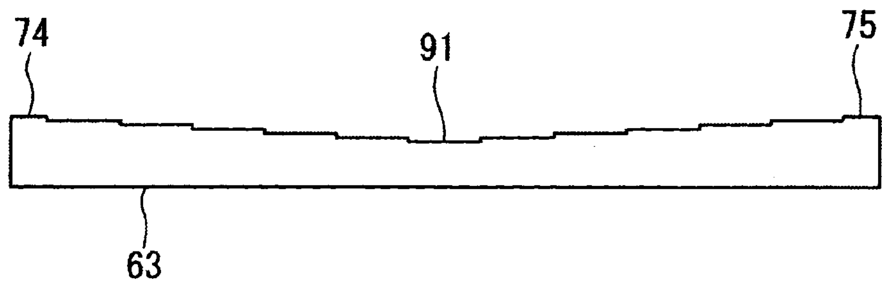
Figure 11C:
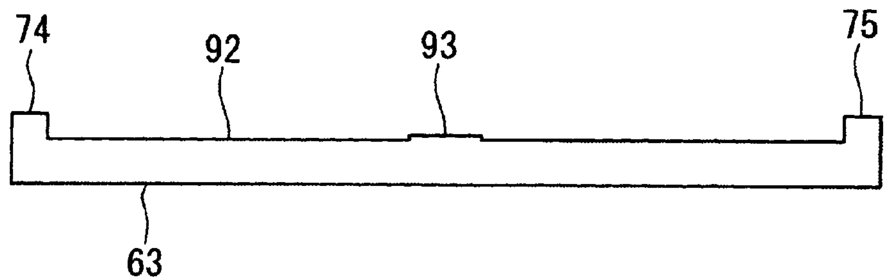

Although the upper ends 69, 73 of the supporting portions 62, 63 define horizontal surfaces, the shapes of the upper ends 69, 73 may be changed. FIGS. 11A, 11B, and 11C show modified upper ends of the supporting portion 63. Details of modified upper ends of the supporting portion 62 will be omitted because the supporting portion 62 may be modified similarly to the supporting portion 63.

As shown in FIG. 11A, an upper end 90 between the projections 74, 75 of the supporting portion 63 may be configured to have a bent surface, such that the upper end 90 is lowest at its center. The bent surface of the upper end 90 is formed to conform to the contact glass 14 when it is being bent with respect to the CIS moving direction. The contact glass 14 in the second posture is supported by the upper end 90, which contacts, along its entire length, the lower surface of the contact glass 14. A force supporting the contact glass 14 is thus dispersed in the contact glass 14 along the CIS moving direction. Accordingly, the contact glass 14 is unlikely to be broken.

As shown in FIG. 11B, an upper end 91 between the projections 74, 75 of the supporting portion 63 may be configured to have steps, such that the upper end 91 is lowest at its center. The steps of the upper end 91 are formed to conform to the contact glass 14 being bent with respect to the CIS moving direction. The contact glass 14 in the second posture is supported by the upper end 91, which contacts, at its plural portions, the lower surface of the contact glass 14. A force supporting the contact glass 14 is thus dispersed in the contact glass 14 along the CIS moving direction. Accordingly, the contact glass 14 is unlikely to be broken.

As shown in FIG. 11C, an upper end 92 between the projections 74, 75 of the supporting portion 63 may be configured to have a horizontal surface, and a projection 93 lower than the projections 74, 75 may be formed at substantially the center of the upper end 92. The contact glass 14 in the second posture is supported by the projection 93. If the supporting portion 63 is molded from synthetic resin, the degree of bend of the contact glass 14 in the second posture can be readily adjusted by merely adjusting the height of the projection 93.

Figure 11D:
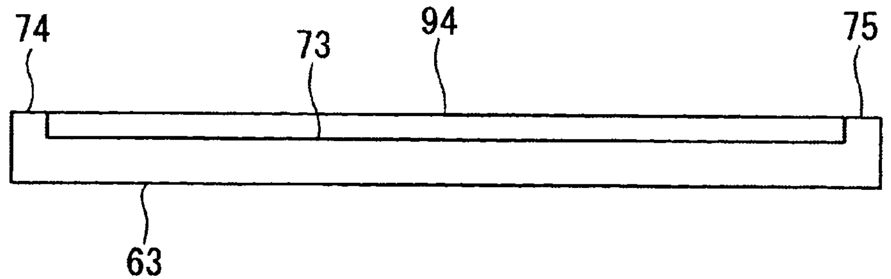

In the above-described embodiment and modifications, there is a gap between the upper ends 69, 73 of the supporting portions 62, 63 and the contact glass 14 when the contact glass 14 is in the first posture. Alternatively, the gap may be filled with an elastic member. As shown in FIG. 11D, an upper end 73 that is lower than the projections 74, 75 may be formed between the projections 74, 75. The upper end 73 does not contact the contact glass 14 in the first posture.

An elastic member 94 may be disposed, as a part of the second supporting structure, on the upper end 73. The elastic member 94 is deformable in the vertical direction by an external force. The elastic member is as thick as the supporting portion 63, and the upper surface of the elastic member 94 is flush with the upper surfaces of the projections 74, 75. Accordingly, the upper surface of the elastic member 94 contacts the lower surface of the contact glass 14. When the contact glass 14 is bent downwardly by an external force, the elastic member 94 is elastically deformed. In other words, the elastic member 94 supports the contact glass 14 such that the contact glass 14 can change from the first posture to the second posture. When the external force is released, the contact glass 14 returns to the first posture reliably by a resilience of the elastic member 94.

As in the above-described embodiment, the projections 74 and 75 shown in FIGS. 11A-11D support, together with the projections 70, 71 and the supporting portions 60, 61, both ends of the contact glass 14 rigidly along the reading line of the CIS 23, thereby preventing the contact glass 14 from being deformed with respect to the direction along the reading line.

Figure 12:
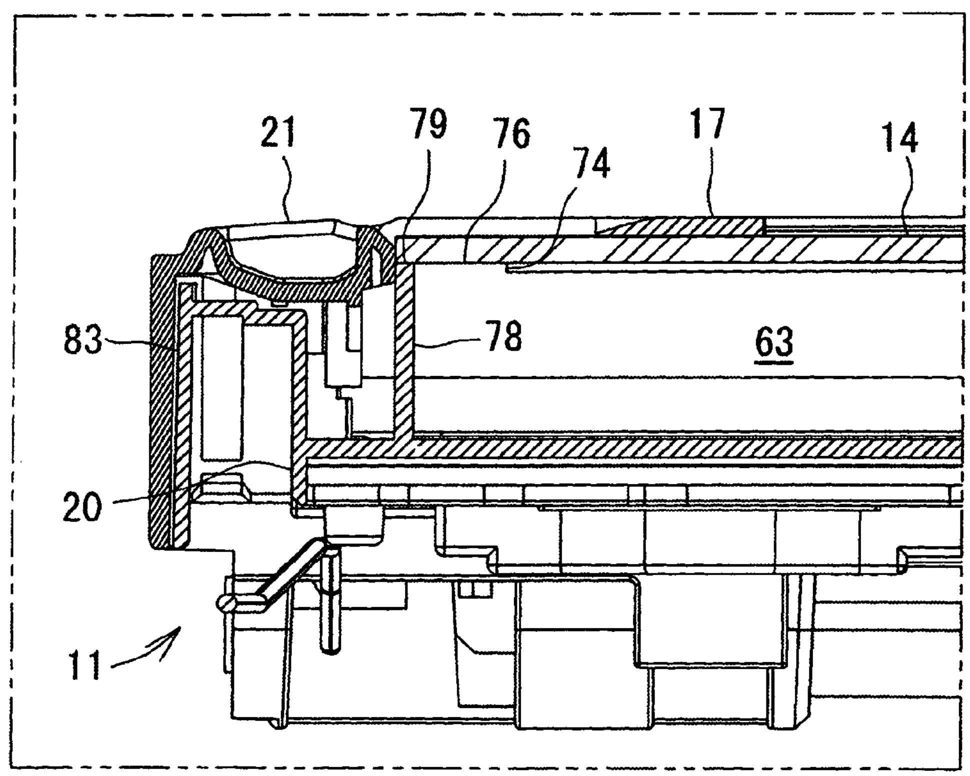
FIG. 12 is a partial sectional view showing a supporting portion extending in a direction along a reading line of the CIS and provided in a lower frame according to a second embodiment of the present invention.

Although the supporting portion 60 is provided in the upper cover 21 in the above-described embodiment, the supporting portion 60 may be provided in the lower frame 20 similar to the other supporting portions 61-63. FIG. 12 is a partial sectional view of a second embodiment of the present invention, showing a supporting portion 78 which is provided in the lower frame 20. The structure of a document stand 11 shown in FIG. 12 is the same as that of the above-described first embodiment, other than the supporting portion 78. The same reference numbers as in the above-described embodiment are used for identical or similar members.

As shown in FIG. 12, another part of the first supporting structure, in this case the supporting portion 78, may be a rib that stands upright along and inside the left side wall 83 of the lower frame 20. The supporting portion 78 extends along substantially the entire length of the lower frame 20 in the front-rear direction. The supporting portion 78 has substantially the same length as that of the contact glass 14 in the front-rear direction. An upper surface 79 of the supporting portion 78 is horizontal. An end of the contact glass 14 is placed on, and supported by, the top surface 79. The top surface 79 is flush with the top surface 76 of the projection 74. Accordingly, the contact glass 14 is rigidly supported by the supporting portion 78 and the projection 74.

In the above-described first embodiment, the single contact glass 14 is divided by the dividing member 17 into the image reading area for the FBS and the image reading area for the ADF 13, and the single contact glass 14 is supported by the supporting portions 60-63. Alternatively, the image reading area for the FBS and the image reading area for the ADF 13 may be formed by separate contact glasses, as will be described below.

Figure 13:
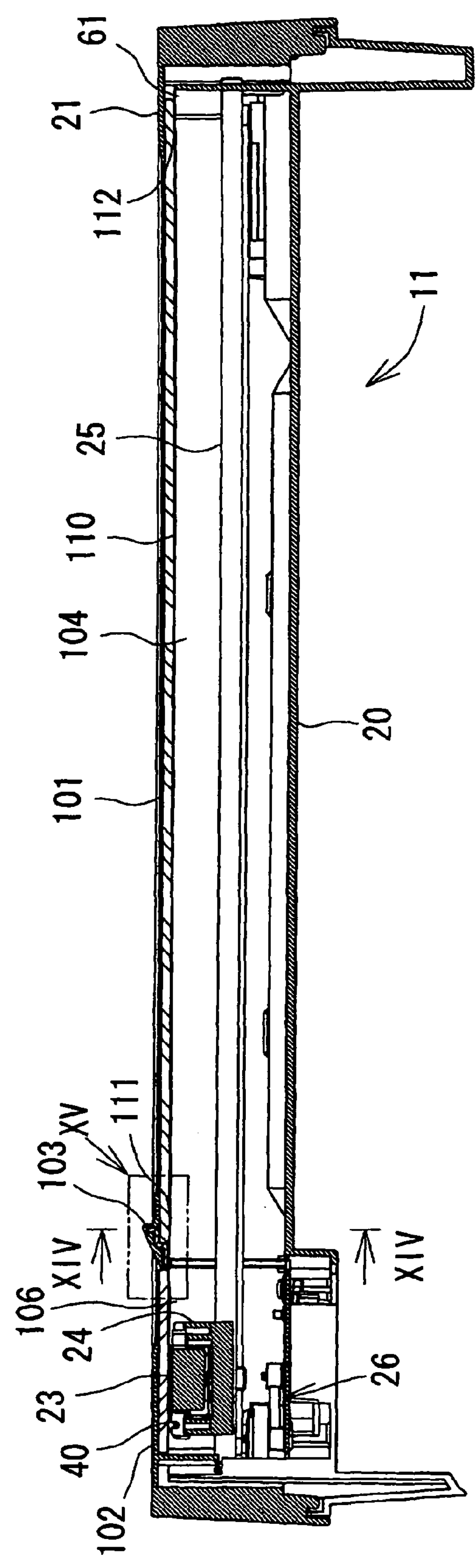
FIG. 13 is a sectional view showing a document stand having two contact glasses that provide a document reading area for a flatbed sensor (FBS) and another document reading area for an automatic document feeder (ADF) according to a third embodiment of the present invention.
Figure 14:
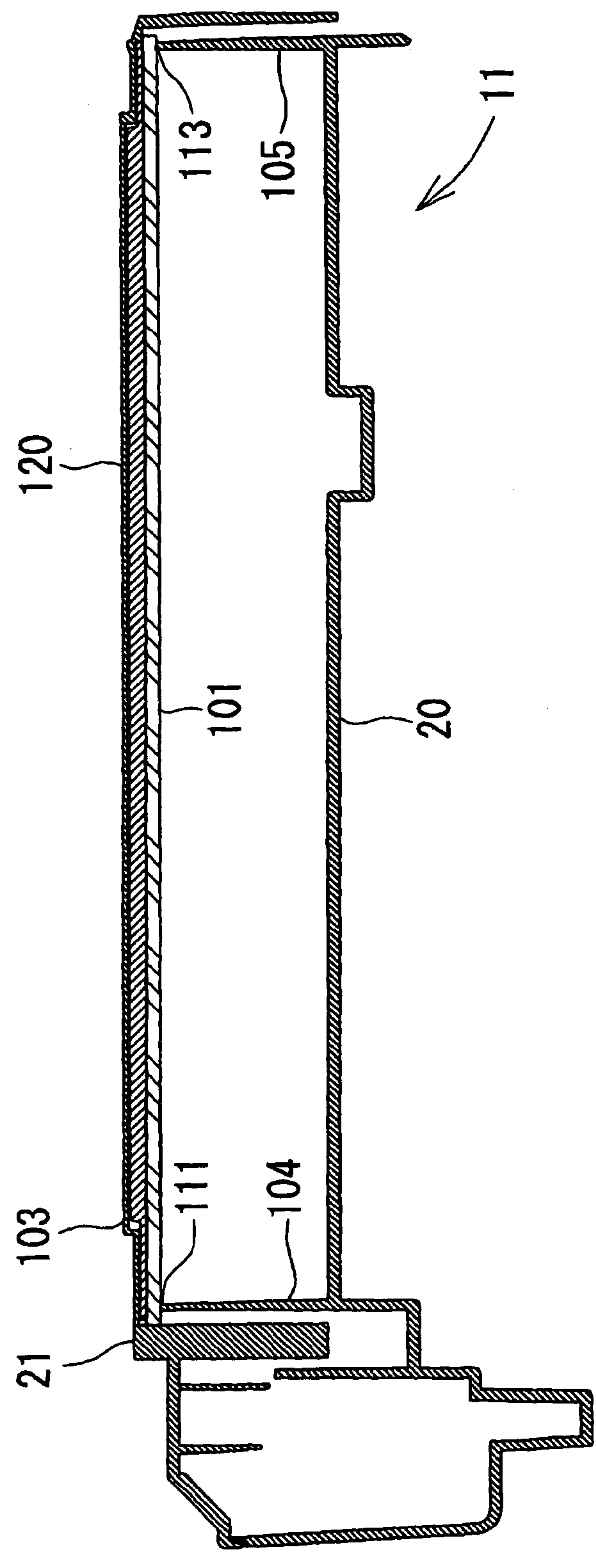
FIG. 14 is a sectional view taken along line XIV-XIV in FIG. 13.
Figure 15:
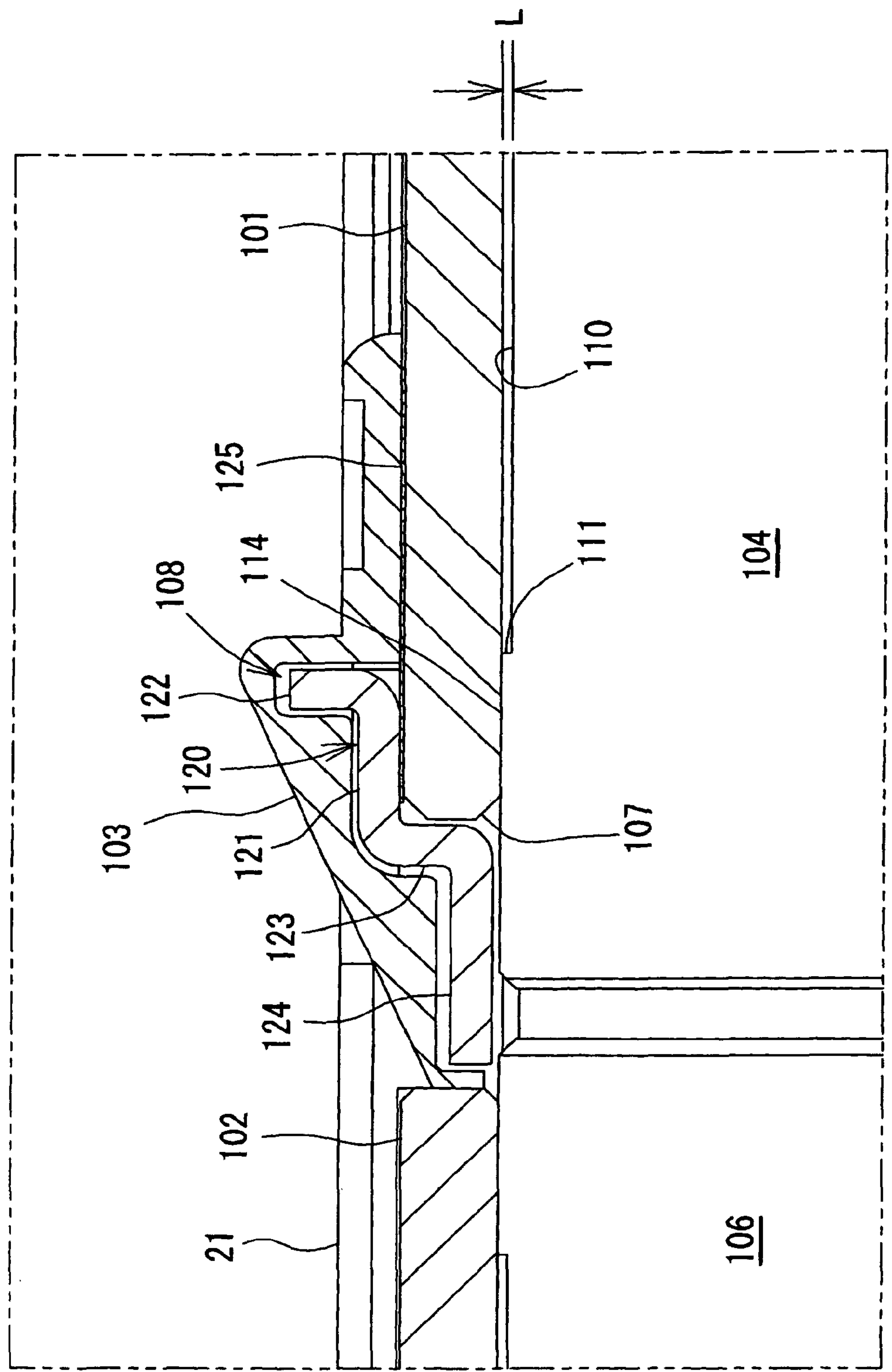
FIG. 15 is an enlarged view of portion XV in FIG. 13.
Figure 16:
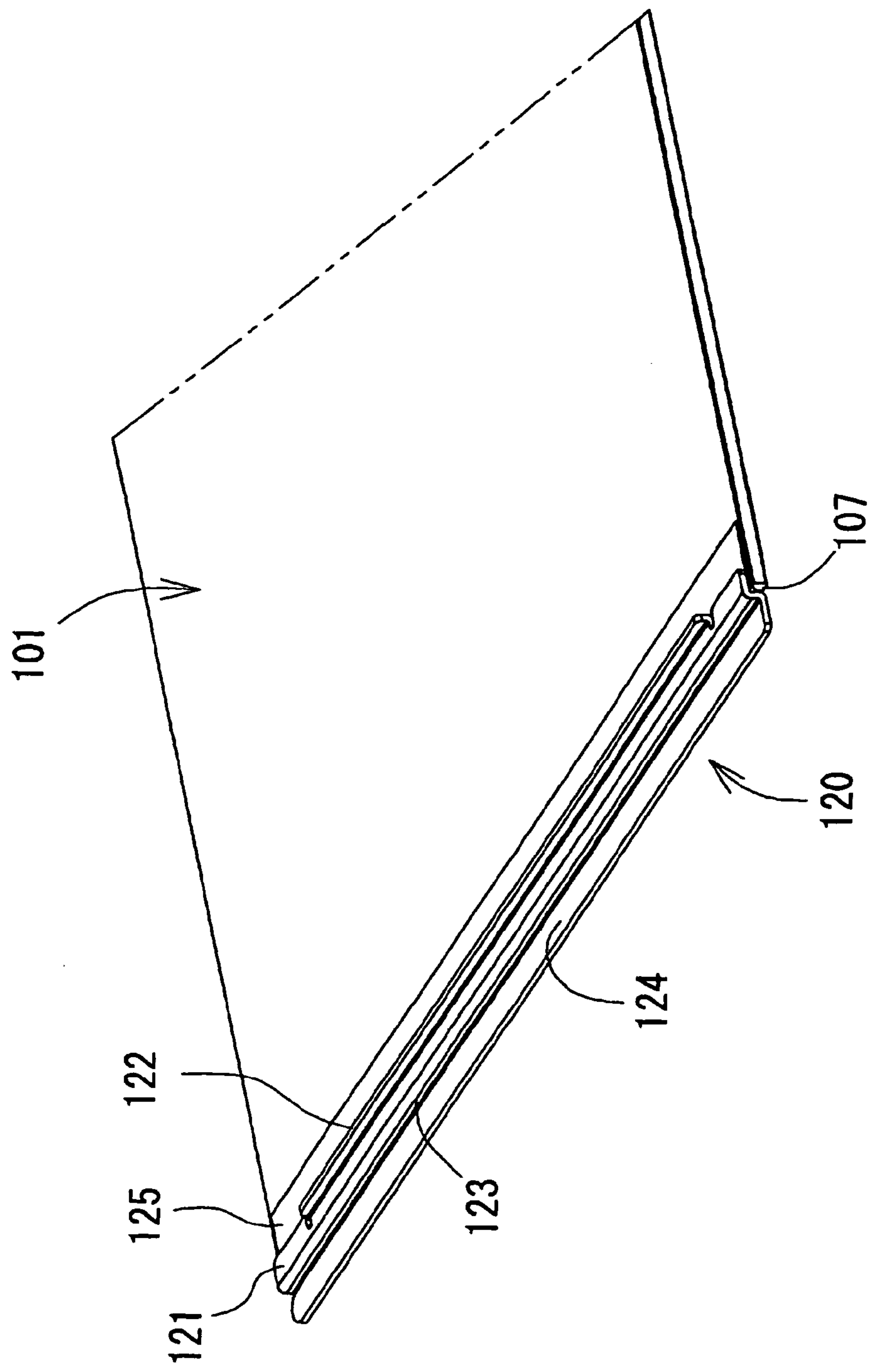
FIG. 16 is a perspective view showing a contact glass and a reinforcing plate according to the third embodiment of the present invention.

FIG. 13 is a sectional view of a third embodiment of the present invention, showing a document stand 11 including two transparent members, in this case contact glasses 101, 102. FIG. 14 is a sectional view taken along line XIV-XIV in FIG. 13. The internal structure of the document stand and side walls of a lower frame 20 are omitted from FIG. 14 for clarity. FIG. 15 is an enlarged view of portion XV in FIG. 13. FIG. 16 is a perspective view showing the contact glass 101 and a reinforcing plate 120. In FIGS. 13 through 16, the same reference numbers as in the above-described embodiments are used for identical or similar members.

Similarly to the above-identified embodiments, the document stand 11 has an opening for an image reading area for a FBS and an opening for an image reading area for an ADF. The image reading area for the FBS is formed by the contact glass 101, and the image reading area for the ADF is formed by the contact glass 102. So long as no external force is applied to the contact glass 101, it remains in a flat plate shape where upper and lower surfaces are flat.

A dividing member 103 is provided between the contact glasses 101, 102. Similarly to the dividing member 17 in the above-described first embodiment, the dividing member 103 is elongated in the front-rear direction of the document stand 11. The dividing member 103 is integrally formed with an upper cover 21 of the document stand 11.

As shown in FIGS. 13 and 14, supporting portions 104, 105 are provided in the lower frame 20. Supporting portions 61 are provided on the right side of the document stand 11, similarly to the above-described embodiment. The supporting portions 104, 105 are provided instead of the supporting portions 63, 62 of the above-described embodiment, respectively. The supporting portion 105 is provided at the front of the document stand 11 instead of the supporting portion 62.

A supporting portion 106 is provided in the lower frame 20 so as to support the contact glass 102. The supporting portion 106 supports a rear end of the contact glass 102. A member (not shown) similar to the supporting portion 106 is also provided to support a front end of the contact glass 102.

The supporting portions 104, 105 are symmetrical with respect to the front-rear direction of the document stand 11.

The supporting portion 104 will be described in detail by way of example. As shown in FIG. 13, the supporting portion 104 is a rib that stands upright inside and along a rear side wall 73 (FIG. 3) of the lower frame 20. The supporting portion 104 extends in the right-left direction of the lower frame 20 along the image reading area for the FBS. A part of the first supporting structure, in this case projections 111, 112, are provided at right and left ends of the supporting portion 104 so as to project upward from an upper end 110 of the supporting portion 104. The projections 111, 112 contact the lower surface of the contact glass 101 to support the contact glass 101. Similarly to the supporting member 104, the supporting portion 105 has, at its right and left ends, projections. In FIG. 14, another part of the first supporting structure, in this case a projection 113, at the left end of supporting portion 105 is shown, however a projection at the right end thereof is not shown.

As shown in FIG. 15, an upper surface 114 of the projection 111 is horizontal. An end 107 of the contact glass 101 is supported, at the rear of the document stand 11, by the upper surface 114 of the projection 111. As shown in FIG. 14, the end 107 of the contact glass 101 is supported, at the front of the document stand 11, by the upper surface of the projection 113.

As shown in FIG. 15, another part of the first supporting structure, in this case the reinforcing plate 120, is provided along the end 107 of the contact glass 101. As shown in FIG. 16, the reinforcing plate 120 is an elongate member that has substantially the same length as the contact glass 101 in the front-rear direction. The reinforcing plate 120 is made by folding a flat steel plate into a crank shape to conform to the upper and end surfaces of the end 107 of the contact glass 101. A first horizontal portion 121 of the reinforcing plate 120 conforms to the upper surface of the contact glass 101. A part of the first horizontal portion 121 is folded upward to form an upright portion 122. The upright portion 122 fits into an inner space 108 of the dividing member 103, thereby horizontally positioning the reinforcing member 120 with respect to the dividing member 103.

The reinforcing plate 120 is folded at substantially a right angle from the first horizontal portion 121 to form a vertical portion 123, and is folded again at substantially a right angle to form a second horizontal portion 124. The first horizontal portion 121, vertical portion 123 and second horizontal portion 124 define a crank-shaped section. The vertical portion 123 conforms to the end surface of the contact glass 101. The second horizontal portion 124 extends in a direction away from the contact glass 101, and the lower surface of the second horizontal portion 124 is substantially flush with the lower surface of the contact glass 101.

A double-sided adhesive tape 125 is sandwiched between the reinforcing plate 120 and the contact glass 101. A first side of the adhesive tape 125 adheres to the lower surface of the first horizontal portion 121, and a second side of the adhesive tape 125 adheres to the upper surface of the contact glass 101. That is, the adhesive tape 125 adheres the first horizontal portion 121 to the upper surface of the contact glass 101. The adhesive tape 125 is much wider than the first horizontal portion 121 and adheres the dividing member 103 to the upper surface of the contact glass 101, as well.

The end 107 of the contact glass 101 extends along the reading line of a CIS 23. The reinforcing plate 120 is disposed at the end 107. As shown in FIG. 14, the end 107 is supported, at the rear and front ends of the document stand 11, by the projections 111, 113, respectively. There is no supporting portion in the middle of the end 107. To be short, the end 107 is supported by the projections 111, 113 only at the rear and front of the document stand 11.

The CIS 23 moves in a space defined between the supporting portions 104, 105. The CIS 23 on which the carriage 24 is mounted can move across the contact glasses 101, 102 because three is no supporting portion under the middle of the end 107. In addition, the lower surface of the reinforcing plate 120 is substantially flush with the lower surfaces of the contact glasses 101, 102. This allows the CIS 23 to move smoothly while contacting the lower surfaces of the contact glasses 101, 102 via the roller units 40, 41.

Although there is no supporting portion in the middle of the end 107, the reinforcing plate 120 is adhered to the end 107 in a fixed condition. The reinforcing plate 120 is rigid enough not to be deformed by an external force applied to the contact glass 101. The reinforcing plate 107 prevents the end 107 of the contact glass 101 from being bent downwardly when a downward load is applied to the contact glass 101. The end 107 is supported rigidly by the projections 111, 113 and the reinforcing plate 120. The other end of the contact glass 101, which is opposite to the end 107, is supported rigidly similarly to the corresponding end of the contact glass 14 of the above-described embodiment and thus details of the other end will be omitted.

As shown in FIG. 15, a part of the second supporting structure, in this case the upper end 110 of the supporting portion 104, is recessed from the contact glass 101 by a distance L and does not contact the contact glass 101 while the contact glass 101 is in the flat plate shape of the first posture. The upper end 110 defines a horizontal surface in the right-left direction. Accordingly, the upper end 110 is away from the lower surface of the contact glass 101 throughout the right-left direction. The distance L is set similarly to the above-described embodiment. When a downward load is applied to the contact glass 101, the upper end 110 allows the contact glass 101 to change from the first posture to the second posture, where the contact glass 101 is bent downwardly. An upper end of the supporting portion 105 has the same structure as that of the upper end 110 and thus details of the upper end of the supporting portion 105 will be omitted.

When the image reading area for the FBS and the image reading area for the ADF 13 are formed by the two contact glasses 101, 102, the end 107 of the contact glass 101 is rigidly supported by the projections 111, 113 and the reinforcing plate 120 with respect to the reading line of the CIS 23. The end 107 is one of opposed ends of the contact glass 101 and is adjacent to the contact glass 102. In addition, the upper end 110 of the supporting portion 104 is away from the lower surface of the contact glass 101 by the distance L when the contact glass 101 is in the first posture, and contacts the lower surface of the contact glass 101 when the contact glass 101 is in the second posture. Accordingly, the same effects as in the above-described embodiments will be obtained.

In the embodiments described above, the first supporting structure supports the transparent member rigidly with respect to the direction along the reading line. "Supporting an object rigidly with respect to a specified direction" as used herein means supporting an object such that the object is not deformed with respect to the specified direction by an external force. The transparent member is prevented by the first supporting structure from being deformed with respect to the direction along the reading line when an external force is applied to the transparent member. Accordingly, a distance between the transparent member and the line sensor is kept uniform with respect to the direction along the reading line.

In the embodiments described above, the transparent member remains in the first posture with its upper and lower surfaces flat when no external force is applied to the transparent member, and changes into the second posture when an external force is applied to the transparent member. The second supporting structure allows the transparent member to be bent within a predetermined range with respect to the line sensor moving direction. Accordingly, an external force applied to the transparent member is manifested as a bending of the transparent member with respect to the line sensor moving direction, and the rigidity of the transparent member with respect to the direction along the reading line of the CIS 23 is maintained.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

What is claimed is:

1. An image reading device comprising:

a transparent member shaped like a flat plate and having an image reading area;

a line sensor that moves along the transparent member in a line sensor moving direction, which is perpendicular to a reading line direction of the line sensor, so as to read an image of a document placed on the image reading area;

a first supporting structure that supports, at opposite ends of the image reading area with respect to the line sensor moving direction, the transparent member rigidly with respect to the reading line direction, such that the transparent member is not deformed with respect to the reading line direction when an external force is applied to the transparent member; and a second supporting structure that supports, at opposite ends of the image reading area with respect to the reading line direction, the transparent member with respect to the line sensor moving direction, such that the transparent member is movable between a first posture, where the transparent member is in the flat plate shape, and a second posture, where the transparent member is bent with respect to the line sensor moving direction.

2. The image reading device according to claim 1;

wherein the first supporting structure includes:

a supporting portion that is provided along the reading line direction; and projections that are provided near opposite ends of the supporting portion with respect to the reading line direction;

wherein the supporting portion and the projections support a lower surface of the transparent member.

3. The image reading device according to claim 2;

wherein the supporting portion extends along substantially an entire length of the transparent member along the reading line direction.

4. The image reading device according to claim 2;

wherein the supporting portion includes a plurality of ribs which are arranged at predetermined intervals along the reading line direction.

5. The image reading device according to claim 2;

wherein the second supporting structure includes a pair of ribs; and wherein the pair of ribs are opposed to each other with respect to the reading line direction and extend along the line sensor moving direction.

6. The image reading device according to claim 5, further comprising:

a lower frame that supports thereon the transparent member and stores therein the line sensor, and a top cover that covers a periphery of the transparent member and has an opening through which an exposed area of the transparent member is exposed, the exposed area of the transparent member forming the image reading area, wherein the supporting portion of the first supporting structure is formed at an edge of the opening of the top cover or at a side wall of the lower frame;

wherein the pair of ribs of the second supporting structure are formed at opposed side walls of the lower frame; and wherein each of the projections of the first supporting structure is formed at an end of a corresponding one of the pair of ribs with respect to the line sensor moving direction.

7. The image reading device according to claim 1, further comprising:

a second transparent member; and a dividing member disposed between the transparent member and the second transparent member;

wherein the first supporting structure includes:

a reinforcing plate which is disposed under the dividing member and extends along substantially an entire length of the transparent member along the reading line direction; and projections which are provided near opposite ends of the reinforcing plate with respect to the reading line direction;

wherein the reinforcing plate is fixedly attached to an upper surface of an end, with respect to the line sensor moving direction, of the transparent member; and wherein the projections support a lower surface of the end, in the line sensor moving direction, of the transparent member.

8. The image reading device according to claim 1;

wherein the second supporting structure is recessed from the transparent member when the transparent member is in the first posture, and contacts the transparent member when the transparent member is in the second posture.

9. The image reading device according to claim 8;

wherein the second supporting structure includes a rib that extends along the line sensor moving direction; and wherein an upper end of the rib is recessed from a lower surface of the transparent member when the transparent member is in the first posture, and contacts the lower surface of the transparent member when the transparent member is in the second posture.

10. The image reading device according to claim 1;

wherein the second supporting structure is in contact with the transparent member when the transparent member is in the first posture; and wherein the second supporting structure elastically deforms to allow the transparent member to move to the second posture.

11. The image reading device according to claim 10;

wherein the second supporting structure includes:

a rib that extends along the line sensor moving direction; and an elastic member wherein an upper end of the rib is recessed from a lower surface of the transparent member when the transparent member is in the first posture; and wherein the elastic member is located on top of the recessed upper end of the rib and contacts the lower surface of the transparent member when the transparent member is in the first posture.

12. The image reading device according to claim 1, further comprising:

a carriage configured to move along the line sensor moving direction;

wherein the line sensor is mounted on the carriage, and is elastically urged toward the transparent member.

13. The image reading device according to claim 12;

wherein the line sensor has, at opposite ends thereof with respect to the reading line direction, rollers that contact a lower surface of the transparent member.

14. The image reading device according to claim 1;

wherein the line sensor is a contact image sensor.

* * * * *